Aug. 23, 1938.　　　　E. H. MUELLER　　　　2,127,611
COUPLING
Filed Aug. 22, 1936
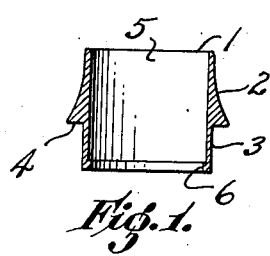
Fig.1.
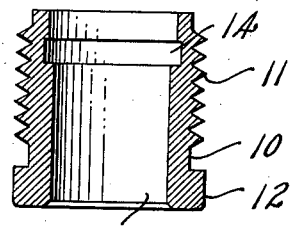
Fig.2.
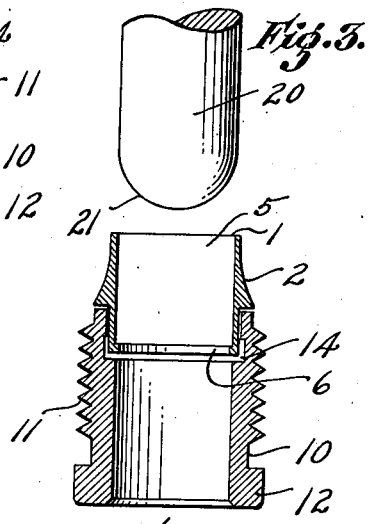
Fig.3.
Fig.4.
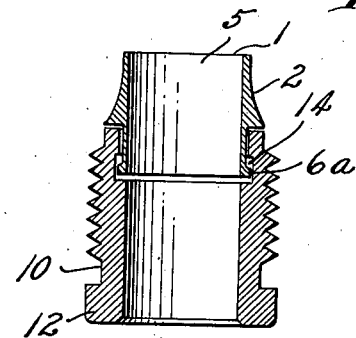
Fig.5.
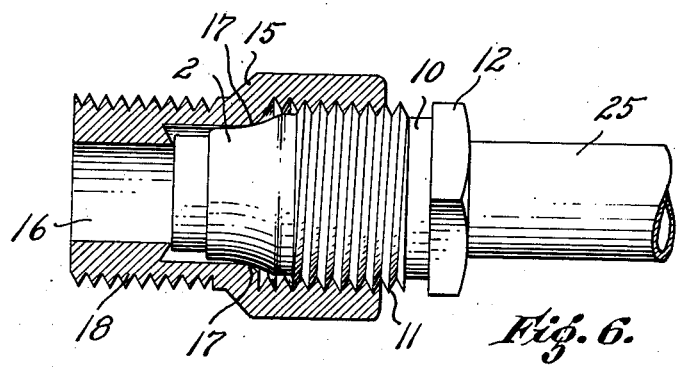
Fig.6.
INVENTOR.
Ervin H. Mueller
BY
Barnes, Kisselle, Laughlin, Raisch
ATTORNEY.

Patented Aug. 23, 1938

2,127,611

UNITED STATES PATENT OFFICE 2,127,611

COUPLING

Ervin H. Mueller, Detroit, Mich.

Application August 22, 1936, Serial No. 97,348

2 Claims. (Cl. 285—166)

This invention relates to the coupling of the ends of tubes or pipes to other devices such as machine elements, containers, manifolds, carburetors, other tubes or pipes, or the like, where the attachment is provided by a coupling and the end of the tube is not secured by screw threads.

The invention is directed particularly to a coupling of improved structure and the method of making the same. Usually relatively small tubes are secured in this manner, as for example, gas conducting tubes, oil tubes, gasoline lines, tubes in refrigerator mechanism or the like. The invention aims to provide an improved and simplified coupling wherein the tube is subjected to compressive forces when the coupling is made. A further object is the provision of a coupling wherein alignment of some of the parts, to secure a gas tight or fluid tight joint, is readily obtained. Other objects will appear as the detailed description is considered in connection with the accompanying drawing.

Fig. 1 is a cross sectional view of a ferrule in its initial form.

Fig. 2 is a cross sectional view taken through one of the fittings.

Fig. 3 is a view of a tool which may be used in assembling the ferrule and fitting.

Fig. 4 is a cross sectional view of the ferrule and fitting in assembled relation just prior to final assembly thereof.

Fig. 5 is a cross sectional view of a completed coupling member embodying one coupling member and a ferrule.

Fig. 6 is a view showing a completed coupling.

As shown in Fig. 1 a ferrule member 1 is formed with a tapered head 2 and a tubular extension 3, there being a shoulder formed as at 4. The ferrule has an axial bore therethrough, as shown at 5. The ferrule has an internal projecting structure which may be in the form of an annular internal bead as shown at 6.

One coupling member is shown at 10, and in the form shown this is a male coupling member with external screw threads 11 and a nut portion 12. This member has an axial bore 13 therethrough and this bore is provided with an enlargement structure which may take the form of an enlarged circumferential groove 14.

The cooperating coupling member is shown at 15 having internal threads for the reception of the coupling member 10 and having a bore 16 extending therethrough. This coupling member has an inclined or tapered internal shoulder 17 designed to cooperate with the tapered head 2 of the ferrule. The taper on the ferrule and the taper of the shoulder 17 may be on similar radii, but are broadly described herein as being tapered or inclined. The member 15 may have a screw threaded portion 18 for its attachment to any other part, machine element or device such as a carburetor, manifold, container or fluid operated mechanism.

The ferrule and the coupling member 10 are preferably attached together in what may be termed a permanent relation. This may be done as follows: The extension 3 of the ferrule is placed into the bore 13 of the coupling. The preferred arrangement is that the ferrule fits somewhat loosely in the bore for purposes which will presently appear. As shown in Fig. 4 it will be noted that the portion of the ferrule provided with the internal flange 6 lies substantially in alignment with the groove 14. A suitable tool 20 is now passed into the ferrule, and this may be a rotating tool having a diameter such as to nicely fit in the bore 5, and the end of the tool is formed on somewhat of a taper as at 21. This tool strikes the internal flange 6 and expands the metal to thus make the bore 5 through the ferrule substantially uniform in diameter. The thickened metal at the flange 6 is thrown outwardly, and thus the metal is caused to provide an external flange 6a which lies in the groove 14.

It is preferred that the axial extent of the flange 6a which is thrown up by shifting the metal of the ferrule be somewhat less than the axial dimension of the groove 14. Therefore the ferrule, when assembled with the fitting 10, is capable of a limited amount of axial movement relative to the fitting 10. Now this arrangement, in conjunction with the fact that the outside diameter of the extension 3 of the ferrule is such as to permit the ferrule to loosely fit into the bore 13, permits the ferrule, within relatively close limits, to have a freedom of movement relative to the fitting. In other words the ferrule may be shifted axially, or may be cocked, or both, relative to the fitting 10. Stating in another way the ferrule is mounted in a floating manner relative to the fitting 10. The arrangement is preferably such that the ferrule may be shifted toward the fitting to cause the shoulder 4 to abut directly against the end of the fitting 10.

A connection is made after the manner illustrated in Fig. 6. The fitting 15 may be located in position on its cooperating machine element, container, or other device, such as any one of those above mentioned; the assembled fitting and ferrule may be passed over the end of a tube 25, and then with the tube thus positioned the fitting 10 is screw threaded into the fitting 15. The tapered head of the ferrule meets the inclined seat 17, and as the parts are tightened together compressive forces tend to collapse the tapered head of the ferrule against the tube wall so that the tube is tightly gripped. Due to the fact that the ferrule floats relative to the fitting 10 it is assured that the ferrule will properly seat all around on the inclined shoulder 17. There may be some slight variations or inaccuracies in the forming of the shoulder, or the ferrule, or the screw threads of the fitting members, but this is nicely taken care of by the floating mounting of the ferrule. As the parts come together the end of the fitting 10 may snugly abut against the shoulder 4 of the ferrule so that a tight joint is effected at this point as well as between the ferrule and the shoulder 17. The ferrule, because of its partial collapsing, tightly engages the tube and thus forms a tight joint with the exterior of the tube.

In couplings of this nature the coupling members are quite customarily made of brass or other equivalent metal, that is the coupling members 10 and 15. The ferrule members may likewise be made of suitable metal, which however may vary with different requirements and in different environments. For example, ferrule 3 may be made of brass or other metal suitable for the purpose, such as metal having considerable ductile characteristics such as lead or lead compositions, aluminum, aluminum alloys, or the like.

The coupling is one which may be termed as being a double compression semi-rigid type. When the coupling is made the ferrule is compressed and the tube is compressed by the compression of the ferrule. The semi-rigid feature lies in this, that the ferrule was more or less floating relative to its associated fitting as distinguished from being rigid therewith, as is the case where the fitting may be provided with an integral tapered end or a separate ferrule rigidly attached thereto by press fitting, riveting or the like.

I claim:

1. A coupling for tube ends or the like comprising, a fitting having an internal inclined shoulder, a second fitting adapted to be screw threaded into the first, both fittings having bores therethrough, a ferrule having a portion telescoped into the bore of the second fitting and having a shoulder arranged to abut against the end of the second fitting, said ferrule having a tapered head adapted to engage the inclined shoulder of the first fitting, the bore of the second fitting having circumferential groove therein, and the telescoping part of the ferrule having an external shoulder fashioned into said groove to permanently unite the second fitting and ferrule.

2. A coupling for tube ends or the like comprising, a fitting having an internal inclined shoulder, a second fitting adapted to be screw threaded into the first, both fittings having bore therethrough, a ferrule having a portion telescoped into the bore of the second fitting and having a shoulder arranged to abut against the end of the second fitting, said ferrule having a tapered head adapted to engage the inclined shoulder of the first fitting, the bore of the second fitting having a circumferential groove therein, and the telescoping part of the ferrule having an external shoulder fashioned into said groove to permanently unite the second fitting and ferrule, said ferrule loosely telescoping into the second fitting, and the axial extent of the groove in the second fitting being greater than the axial extent of the external shoulder on the ferrule, whereby the ferrule is united to the fitting in a floating manner.

ERVIN H. MUELLER.